United States Patent
Hickey et al.

(10) Patent No.: US 10,991,129 B2
(45) Date of Patent: Apr. 27, 2021

(54) PAINT COLOR PROJECTOR

(71) Applicants: Daniel Hickey, Cranford, NJ (US); Paul Kellett, Cranford, NJ (US)

(72) Inventors: Daniel Hickey, Cranford, NJ (US); Paul Kellett, Cranford, NJ (US)

( * ) Notice: Subject to any disclaimer, the term of this patent is extended or adjusted under 35 U.S.C. 154(b) by 267 days.

(21) Appl. No.: 16/005,874

(22) Filed: Jun. 12, 2018

(65) Prior Publication Data

US 2018/0357795 A1 Dec. 13, 2018

Related U.S. Application Data

(60) Provisional application No. 62/518,222, filed on Jun. 12, 2017.

(51) Int. Cl.

| | |
|---|---|
| *G06T 11/00* | (2006.01) |
| *G06Q 30/06* | (2012.01) |
| *H04M 1/02* | (2006.01) |
| *G03B 21/30* | (2006.01) |
| *G03B 33/00* | (2006.01) |
| *H04N 9/31* | (2006.01) |

(52) U.S. Cl.
CPC ............ *G06T 11/001* (2013.01); *G03B 21/30* (2013.01); *G03B 33/00* (2013.01); *G06Q 30/0641* (2013.01); *H04M 1/0272* (2013.01); *H04N 9/3173* (2013.01); *H04N 9/3182* (2013.01); *H04N 9/3194* (2013.01); *H04M 2250/52* (2013.01); *H04M 2250/54* (2013.01)

(58) Field of Classification Search
CPC ....... G06T 11/001; G03B 33/00; G03B 21/30; H04N 9/3182; H04N 9/3194; H04N 9/3173; G06Q 30/0641; H04M 1/0272; H04M 2250/54; H04M 2250/52
USPC .......................................................... 382/100
See application file for complete search history.

(56) References Cited

U.S. PATENT DOCUMENTS

| | | | |
|---|---|---|---|
| 4,025,688 A | 5/1977 | Nagy et al. |
| 5,287,130 A | 2/1994 | Umeda |
| 5,318,171 A | 6/1994 | Szekely |
| 5,592,294 A | 1/1997 | Ota et al. |
| 6,196,687 B1 | 3/2001 | Smith |
| 6,412,956 B2 | 7/2002 | Fujita et al. |
| 6,923,543 B2 | 8/2005 | Huber |

(Continued)

FOREIGN PATENT DOCUMENTS

| | | |
|---|---|---|
| CN | 204293875 | 4/2015 |
| CN | 104633489 | 5/2015 |

(Continued)

OTHER PUBLICATIONS https://web.archive.org/web/20170626222926/http://www.arborsci.com/shop-by-topic/light-optics/color?p=2 (Year: 2017).*

*Primary Examiner* — Amandeep Saini
(74) *Attorney, Agent, or Firm* — Gearhart Law LLC

(57) ABSTRACT

Systems and methods for projecting a color onto a surface are provided. The method includes selecting, using an application on a mobile electronic device, a color from a list of one or more colors, identifying a color of a surface onto which the selected color is to be projected, and determining, using a processor, a color of light to be projected onto the surface such that the color of light, in conjunction with the color of the surface, produces the selected color. The method further includes projecting, using a projector, the color of light onto the surface.

14 Claims, 4 Drawing Sheets

(56) References Cited

U.S. PATENT DOCUMENTS

| | | |
|---|---|---|
| 6,961,461 B2 | 11/2005 | MacKinnon et al. |
| 6,985,163 B2 | 1/2006 | Riddle et al. |
| 7,021,772 B2 | 4/2006 | Abe et al. |
| 7,377,657 B2 | 5/2008 | Morejon et al. |
| 7,391,514 B2 | 6/2008 | Merle et al. |
| 7,574,040 B2 | 8/2009 | Ito et al. |
| 8,159,666 B2 | 4/2012 | Jung et al. |
| 8,256,900 B2 | 9/2012 | Bitetto |
| 8,373,857 B2 | 2/2013 | Jung et al. |
| 8,817,243 B2 | 8/2014 | Jung et al. |
| 8,845,108 B2 | 9/2014 | LaDuke et al. |
| 9,767,566 B1* | 9/2017 | Paczkowski ....... H04N 1/00204 |
| 2004/0140982 A1 | 7/2004 | Pate |
| 2004/0239880 A1 | 12/2004 | Kapellner et al. |
| 2005/0206859 A1 | 9/2005 | Miyasaka |
| 2006/0018535 A1 | 1/2006 | Oon et al. |
| 2006/0119800 A1 | 6/2006 | Burnett et al. |
| 2007/0236671 A1* | 10/2007 | Bitetto ................. G03B 21/006 |
| | | 353/122 |
| 2010/0007798 A1 | 1/2010 | Togawa |
| 2010/0244700 A1* | 9/2010 | Chong ................... G06Q 90/00 |
| | | 315/113 |
| 2012/0009395 A1* | 1/2012 | Dain ....................... G09F 19/12 |
| | | 428/195.1 |
| 2014/0354963 A1 | 12/2014 | Kim et al. |
| 2017/0249576 A1* | 8/2017 | Bipes ................. G06Q 30/0611 |

FOREIGN PATENT DOCUMENTS

| | | |
|---|---|---|
| GB | 2385831 | 9/2003 |
| WO | 9316459 | 8/1993 |

\* cited by examiner

PAINT COLOR PROJECTOR

CLAIM OF PRIORITY

This application claims priority to U.S. Application 62/518,222 filed on Jun. 12, 2017 the contents of which are herein fully incorporated by reference in its entirety.

FIELD OF THE EMBODIMENTS

This invention relates to light projections and, in particular, to systems and methods of projecting one or more colors onto a surface to simulate a color of paint on the surface.

BACKGROUND OF THE EMBODIMENTS

Determining a correct color and texture of paint for a wall or a room can be a time consuming and tedious task. Having to look through lengthy and unwieldy books and/or containers of hundreds or thousands of paint samples is not an easy task, particularly due to the physical labor required to consistently walk back and forth, placing new paint samples against the wall and then having to put the paint samples back with the other samples. Furthermore, such a task often requires multiple people to complete since one person must hold the paint samples against the wall while the other person looks at the sample from a distance.

A system and method of easily projecting paint samples onto a surface that eliminates much of the hassles and unwieldy materials associated with selecting a color and texture of paint for a surface is thus needed.

Examples of related art are described below:

U.S. Pat. No. 5,287,130 generally describes a picture projecting device which projects a clear picture even in a bright environment by cutting out the influence of outer light, regardless of the kind of projector used.

U.S. Pat. No. 5,592,294 generally describes an apparatus for measuring a characteristic of an object, wherein the apparatus includes a light projector which projects light to an object, a photosensor which senses light which has been projected by the light projector and reflected from the object, a calculator which calculates a characteristic of the object based on an output of the photosensor, an angle detector which detects respective angles of the light projector and the photosensor with respect to the object, an adjustment mechanism which adjusts the respective angles of the light projector and the photosensor, and a controller which controls the adjustment mechanism based on a detection result of the angle detector so that the light projector and the photosensor come into their respective desired angles.

U.S. Pat. No. 6,923,543 generally describes latent effects projection systems that allow a latent effects projector to be used in connection with various materials, such as wall pieces, floor tiles, signage, hangings, and the like; use reflective polarizers having various looks and/or which allow for the development of different color palettes; which are relatively insensitive to heat; and/or use plural retarders to generate relatively more saturated colors and/or latent colors that are substantially repeatable.

U.S. Pat. No. 8,256,900 generally describes a system and method for projecting an image with predetermined characteristics, which includes a projector configured to project light on a surface, and a photo sensor configured to analyze light reflected from the surface. A controller is configured to compare the reflected light with a selected characteristic. The controller is configured to control the projector to adjust the projected light such that the reflected light substantially matches the selected characteristic to make the surface appear to be of the selected characteristic.

U.S. Patent Application Publication No. 2006/0018535 generally describes a method and apparatus for duplicating a target color and changing a color of an object to match the target color. A first color sensor measures the target color. A color projection mechanism selectively changes the color of the object. A color matching mechanism is coupled to the first color sensor for receiving the target color. Based on the target color, the color matching mechanism controls the color projection mechanism to change the color of the object to match the target color.

None of the art described above addresses all of the issues that the present invention does.

SUMMARY OF THE EMBODIMENTS

According to an aspect of the present invention, a method is provided for projecting a color onto a surface. The method includes selecting, using an application on a mobile electronic device, a color from a list of one or more colors, identifying a color of a surface onto which the selected color is to be projected, and determining, using a processor, a color of light to be projected onto the surface such that the color of light, in conjunction with the color of the surface, produces the selected color. The method further includes projecting, using a projector, the color of light onto the surface.

According to another aspect of the present invention, a system is provided for projecting a color onto a surface. The system includes a mobile electronic device, wherein the mobile electronic device includes a graphical user interface and a processor. The processor has a memory, the memory having computer readable instructions stored thereon that, when executed by the processor, cause the processor to perform the steps of enabling a user to select a color from a list of one or more colors, identifying a color of a surface onto which the selected color is to be projected, determining a color of light to be projected onto the surface such that the color of light, in conjunction with the color of the surface, produces the selected color, and projecting the color of light onto the surface. The system further includes a projector configured to project the color of light onto the surface.

It is an object of the present invention to provide for the method for projecting a color onto a surface, wherein the identifying includes receiving, from a user, the color of the surface in such that the user manually inputs the color of the surface onto the mobile electronic device.

It is an object of the present invention to provide for the method for projecting a color onto a surface, wherein the identifying includes receiving, from a camera, an image of the surface, analyzing the image, using the mobile electronic device, and, based on the analysis, determining, using the mobile electronic device, the color of the surface.

It is an object of the present invention to provide for the method for projecting a color onto a surface, wherein the camera is coupled to the mobile electronic device.

It is an object of the present invention to provide for the method for projecting a color onto a surface, wherein the projector is coupled to the mobile electronic device.

It is an object of the present invention to provide for the method for projecting a color onto a surface, wherein the projector is integrated into the mobile electronic device.

It is an object of the present invention to provide for the method for projecting a color onto a surface, wherein the projector projects the color of light as a square onto the surface.

It is an object of the present invention to provide for the method for projecting a color onto a surface, wherein each side of the square has dimensions of approximately 45-61 cm.

It is an object of the present invention to provide for the method for projecting a color onto a surface, wherein the determining includes adjusting the color of light to coincide with an amount of lighting on the surface.

It is an object of the present invention to provide for the method for projecting a color onto a surface, further comprising purchasing an amount of paint, using the application on the mobile electronic device, coinciding with the selected color.

It is an object of the present invention to provide for the system for projecting a color onto a surface, wherein the identifying includes receiving, from a user, using the graphical user interface, the color of the surface in such that the user manually inputs the color of the surface onto the mobile electronic device.

It is an object of the present invention to provide for the system for projecting a color onto a surface, further comprising a camera, and wherein the identifying includes receiving, from the camera, an image of the surface, analyzing the image, using the processor, and based on the analysis, determining the color of the surface.

It is an object of the present invention to provide for the system for projecting a color onto a surface, wherein the camera is coupled to the mobile electronic device.

It is an object of the present invention to provide for the system for projecting a color onto a surface, wherein the projector is coupled to the mobile electronic device.

It is an object of the present invention to provide for the system for projecting a color onto a surface, wherein the projector is integrated into the mobile electronic device.

It is an object of the present invention to provide for the system for projecting a color onto a surface, wherein the projector is further configured to project the color of light as a square onto the surface.

It is an object of the present invention to provide for the system for projecting a color onto a surface, wherein each side of the square has dimensions of approximately 45-61 cm.

It is an object of the present invention to provide for the system for projecting a color onto a surface, wherein the determining includes adjusting the color of light projected from the projector to coincide with an amount of lighting on the surface.

It is an object of the present invention to provide for the system for projecting a color onto a surface, wherein the memory, when executed by the processor, causes the processor to further perform the step of purchasing, using the graphical user interface, an amount of paint coinciding with the selected color.

DESCRIPTION OF THE PREFERRED EMBODIMENTS

Figure 1:
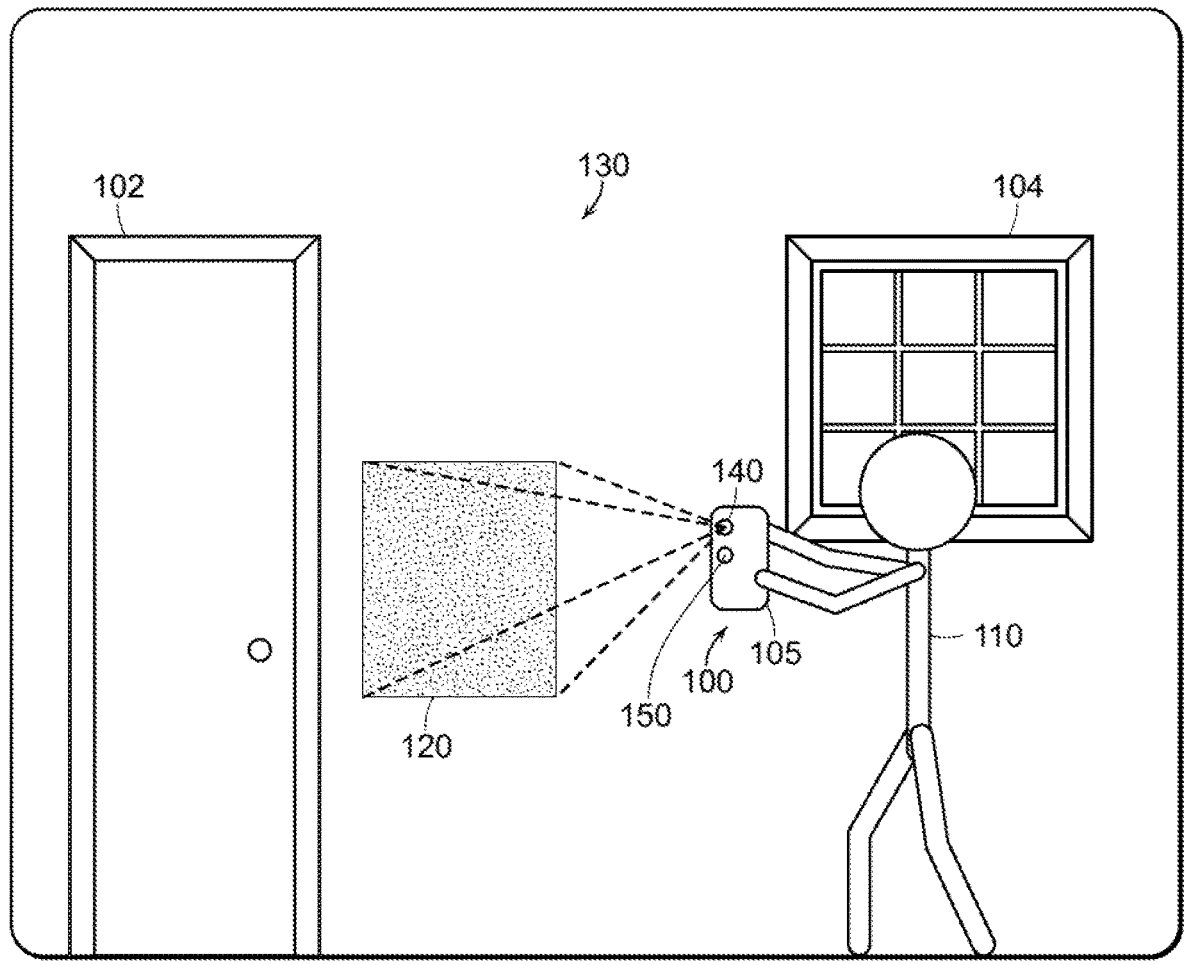
FIG. 1 shows a diagram of a user using a system for projecting a color onto a surface, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, a diagram of a user 110 using a system 100 for projecting a color 120 onto a surface 130 is illustratively depicted, according to an embodiment of the present invention.

Figure 3:
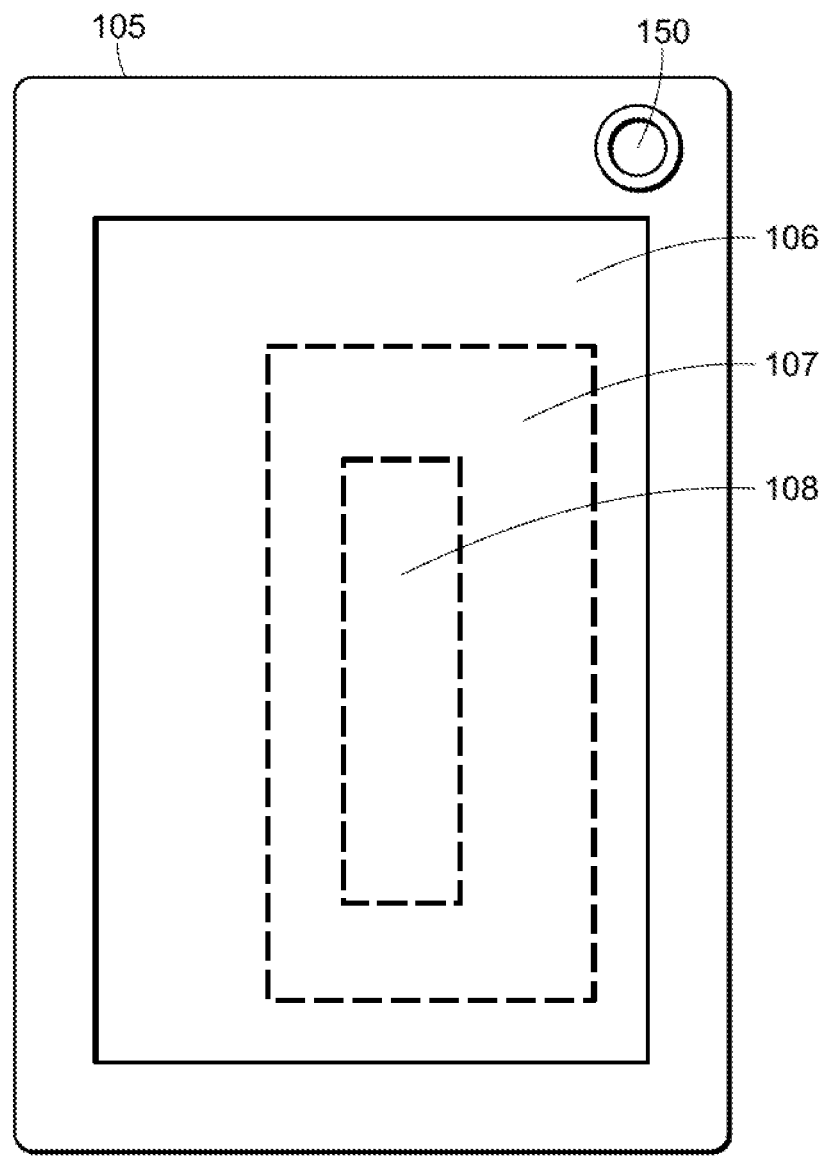
FIG. 3 shows a diagram of a front view of a mobile electronic device, according to an embodiment of the present invention.

According to an embodiment, the system includes a mobile electronic device 105, wherein the mobile electronic device includes a graphical user interface 106 and a processor 107 (shown in FIG. 3).

According to an embodiment, the processor 107 includes a memory 108 (shown in FIG. 3). According to an embodiment, the memory 108 has computer readable instructions stored thereon that, when executed by the processor 107, cause the processor 107 to perform a variety of steps. These steps include, but are not limited to, enabling a user 110 to select a color from a list of one or more colors, identifying a color of a surface 130 onto which the selected color is to be projected, determining a color of light to be projected onto the surface 130 such that the color of light, in conjunction with the color of the surface, produces the selected color, and projecting the color of light 120 onto the surface 130. The system further includes a projector 140 configured to project the color of light 120 onto the surface 130.

According to an embodiment, the system 100 may identify the color of the surface 130 in a variety of ways. For example, the color of the surface 130 may be input by the user 110 directly into the mobile electronic device 105, using the graphical user interface 106. This may include selecting from a list of colors and/or pinpointing the color using a color gradient scale.

The system 100 may also identify the color of the surface 130 using a camera 150. The camera 150 may be a stand-alone camera or may be coupled to and/or incorporated into the mobile electronic device 105. According to an embodiment, the camera 150 captures one or more images of the surface 130. The mobile electronic device 105 receives the one or more images, analyzes the images, and, from this analysis, determines a color of the surface 130.

According to an embodiment, the mobile electronic device 105 further determines a brightness level of the surface 130 and/or the surrounding area around the surface 130. This brightness detection may be completed using the camera 150 and/or any other suitable light detection apparatus.

According to an embodiment, the color and/or brightness of the surface may be different from other components in the surrounding area of the surface, such as doors 102 and windows 104.

According to an embodiment, mobile electronic device 105 runs an application which enables the user, using the graphical user interface 106, to select one or more colors to project onto the surface 130. The user 110 may also be enabled to select 1 or more textures of paint to project onto the surface 130. The colors may be pre-saved onto the mobile electronic device 105 or may accessible over the Internet. According to an embodiment, the list of colors may be organized by color, texture, brand of paint, and/or any other suitable organizational criteria while maintaining the spirit of the present invention.

According to an embodiment, the application includes an option for a user to purchase paint having color chosen by the user 110, wherein the user 110 is enabled to input any relevant quantity information, payment information, shipping information, and/or any other relevant information. By enabling the user 110 to purchase paint directly from the mobile electronic device, the system 100 eliminates any traveling typically associated with purchasing paint.

Once a desired color and/or texture is selected by the user 110, the projector 140 projected the color 120 onto the surface. According to an embodiment, the selected color is altered prior to being projected such that the projected color 120, in conjunction with the color of the surface 130, producing the selected color on the surface 130. According to an embodiment, the selected color is altered to adjust for the lighting/brightness of the surface 130 and/or surrounding area.

According to an embodiment, the projector 140 is coupled to the mobile electronic device 105. The projector 140 may be incorporated directly into the mobile electronic device 105. The projector 140 may include existing components of the mobile electronic device (such as, e.g., the mobile electronic device's 105 flash) and/or may an entire projector 140 apparatus incorporated into the mobile electronic device 105.

According to an embodiment, the projector 140 projects the projected light 120 onto the surface 130 as a square or other rectangular shape. It is noted, however, that other shapes may also be projected onto the surface 130 while maintaining the spirit of the present invention. According to an embodiment, the sides of the projected shapes have lengths of approximately 45-61 cm. It is noted, however, that other lengths of sides may also be used while maintaining the spirit of the present invention.

Figure 2:
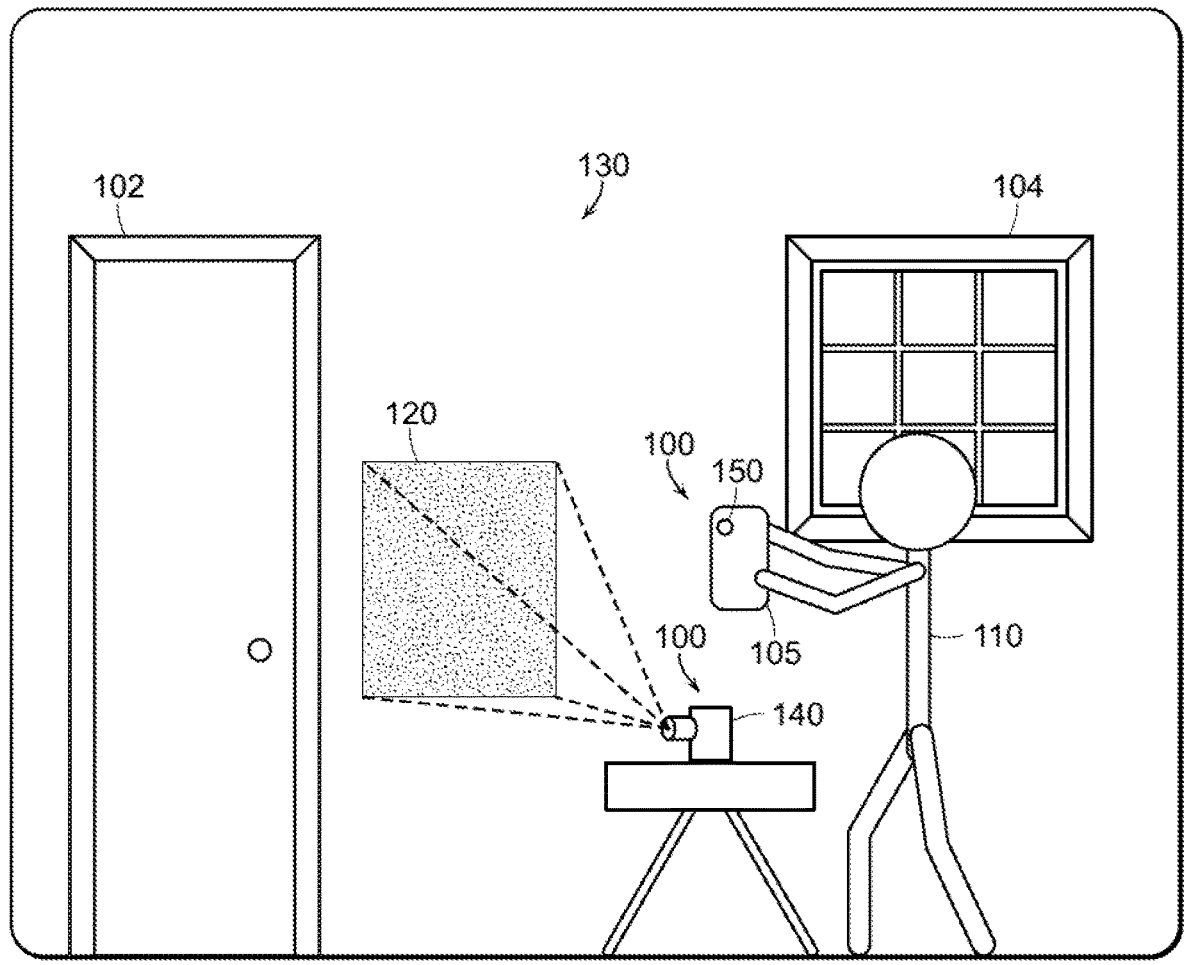
FIG. 2 shows a diagram of a user using an alternate system for projecting a color onto a surface, according to an embodiment of the present invention.

Referring now to FIG. 2, a diagram of a user 110 using a system 100 for projecting a color 120 onto a surface 130 is illustratively depicted, according to an embodiment of the present invention.

According to the embodiment shown in FIG. 2, the projector 140 is separate from the mobile electronic device 105. Such a projector 140 may be wirelessly coupled to the mobile electronic device 105 or coupled to the mobile electronic device 105 through a wired connection.

According to the embodiment shown in FIG. 2, the user 110 need not be in physical contact with the projector 140, enabling the user 110 to move around while the color 120 is projected onto the surface 130.

Figure 4:
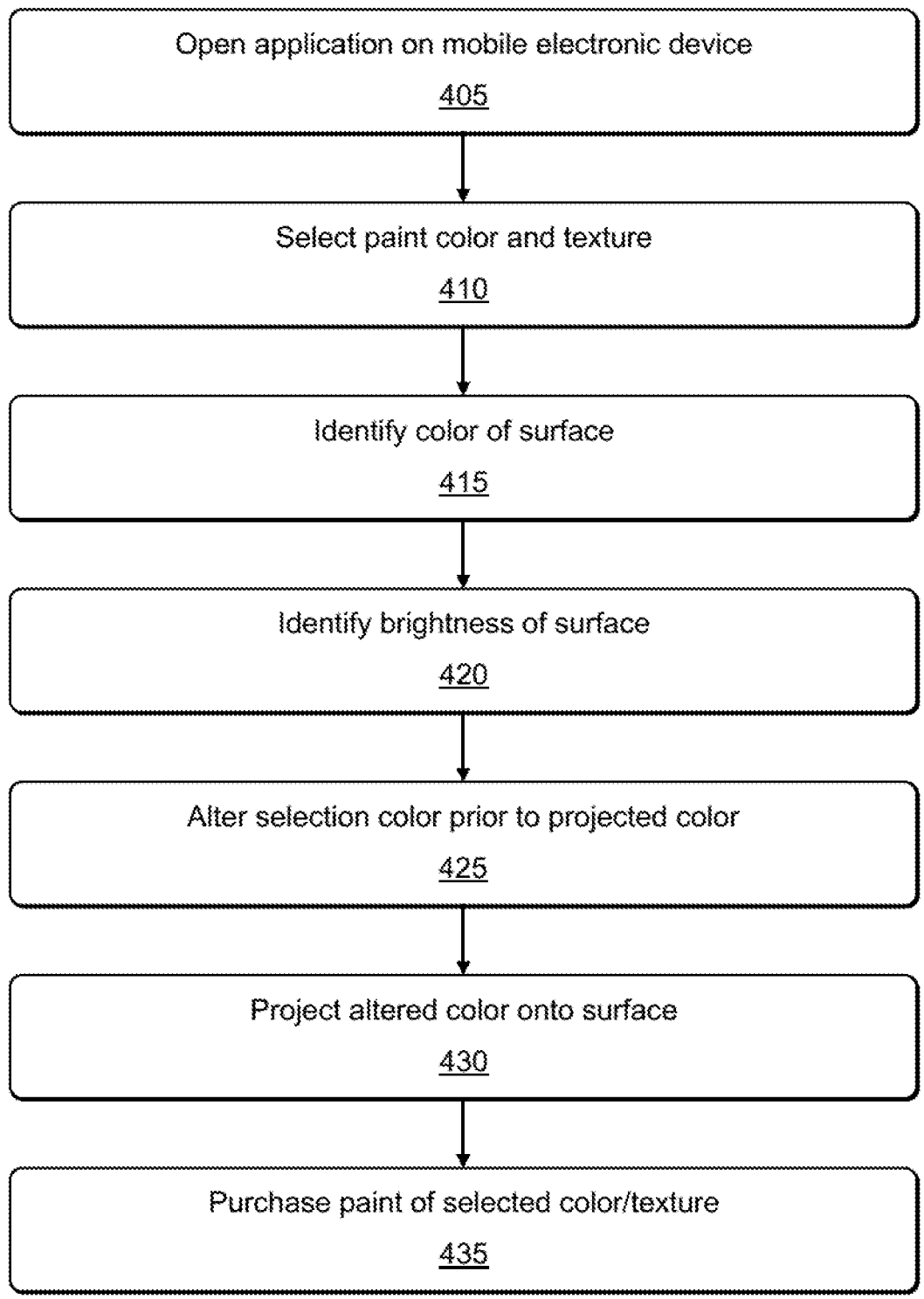
FIG. 4 shows a flowchart of a method for projecting a color onto a surface, according to an embodiment of the present invention.

Referring now to FIG. 4, a flowchart of a method 400 for projecting a color 120 onto a surface 130 is illustratively depicted, in accordance with an embodiment of the present invention.

At step 405, a user 110 opens an application on a mobile electronic device 105. According to an embodiment, the application enables a user 110 to select one or more colors from a listing of colors, wherein the colors correspond to possible paint colors for application on a surface 130.

At step 410, the user 110 selects the one or more colors using a graphical user interface 106 coupled to the mobile electronic device 105. According to an embodiment, the user 110 also selects a texture representing a style of paint.

At step 415, the color of the surface is identified. According to an embodiment, the system 100 may identify the color of the surface 130 in a variety of ways. For example, the color of the surface 130 may be input by the user 110 directly into the mobile electronic device 105, using the graphical user interface 106. This may include selecting from a list of colors and/or pinpointing the color using a color gradient scale.

The system 100 may also identify the color of the surface 130 using a camera 150. The camera 150 may be a standalone camera or may be coupled to and/or incorporated into the mobile electronic device 105. According to an embodiment, the camera 150 captures one or more images of the surface 130. The mobile electronic device 105 receives the one or more images, analyzes the images, and, from this analysis, determines a color of the surface 130.

At step 420, the brightness level of the surface 130 and/or the surrounding area around the surface 130. This brightness detection may be completed using the camera 150 and/or any other suitable light detection apparatus.

At step 425, the system 100 determines, using a processor, a color of light 120 to be projected onto the surface 130 such that the color of light 120, in conjunction with the color of the surface 130, produces the selected color. According to an embodiment, the selected color is altered, prior to being projected, such that the projected color 120, in conjunction with the color of the surface 130, producing the selected color on the surface 130. According to an embodiment, the selected color is altered to adjust for the lighting/brightness of the surface 130 and/or surrounding area.

At step 430, the altered color is projected, using a projector 140, onto the surface 130. According to an embodiment, the projector 140 projects the projected light 120 onto the surface 130 as a square or other rectangular shape. It is noted, however, that other shapes may also be projected onto the surface 130 while maintaining the spirit of the present invention. According to an embodiment, the sides of the projected shapes have lengths of approximately 45-61 cm. It is noted, however, that other lengths of sides may also be used while maintaining the spirit of the present invention.

At step 435, a user purchases and orders paint of the selected color and/or texture using the application and the graphical user interface 106. According to an embodiment, the user 110 is enabled to input any relevant quantity information, payment information, shipping information, and/or any other relevant information. It is noted, however, that the system 100 may be used to analyze and purchase other items for the covering of surfaces such as, e.g., wallpaper, pictures, tile, and/or any other suitable items.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for projecting a color onto a surface, the method comprising:
   selecting, using an application on a mobile electronic device, a color from a list of one or more colors;
   selecting, using the application, a texture representing a style of paint;
   identifying a color of a surface onto which the selected color is to be projected;
   utilizing a light detection apparatus to determine a first brightness level of the surface and a second brightness level of an area surrounding the surface, wherein the first brightness level differs from the second brightness level;
   determining, using a processor, a color of light to be projected onto the surface such that the color of light, in conjunction with the color of the surface, produces the selected color;
   altering the selected color to adjust for at least one of the first brightness level and the second brightness level; and
   projecting, using a projector, the color of light onto the surface in the texture and as a shape selected from the group consisting of: a square shape and a rectangular shape, and wherein a length of each side of the shape is in a range of 45 cm to 61 cm.

2. The method as recited in claim 1, wherein the identifying includes:
   receiving, from a user, the color of the surface in such that the user manually inputs the color of the surface onto the mobile electronic device.

3. The method as recited in claim 1, wherein the identifying includes:
   receiving, from a camera, an image of the surface;
   analyzing the image, using the mobile electronic device; and
   based on the analysis, determining, using the mobile electronic device, the color of the surface.

4. The method as recited in claim 3, wherein the camera is coupled to the mobile electronic device.

5. The method as recited in claim 1, wherein the projector is coupled to the mobile electronic device.

6. The method as recited in claim 5, wherein the projector is integrated into the mobile electronic device.

7. The method as recited in claim 1, further comprising:
   purchasing an amount of paint, using the application on the mobile electronic device, coinciding with the selected color.

8. A system for projecting a color onto a surface, comprising:
   a mobile electronic device, including:
      a graphical user interface; and
      a processor having a memory, the memory having computer readable instructions stored thereon that, when executed by the processor, cause the processor to perform the steps of:
         enabling a user to select a color from a list of one or more colors;
         enabling the user to select a texture that represents a style of paint;
         identifying a color of a surface onto which the selected color is to be projected;
         utilizing a light detection apparatus to determine a first brightness level of the surface and a second brightness level of an area surrounding the surface, wherein the first brightness level differs from the second brightness level, and wherein the area surrounding the surface comprises at least a door or a window;
         determining a color of light to be projected onto the surface such that the color of light, in conjunction with the color of the surface, produces the selected color;
         altering the selected color to adjust for the first brightness level and the second brightness level; and
         projecting the color of light onto the surface in the texture and as a shape selected from the group consisting of: a square shape and a rectangular shape, wherein a length of each side of the shape is in a range of 45 cm to 61 cm; and
   a projector configured to project the color of light onto the surface.

9. The system as recited in claim 8, wherein the identifying includes:
   receiving, from a user, using the graphical user interface, the color of the surface in such that the user manually inputs the color of the surface onto the mobile electronic device.

10. The system as recited in claim 8, further comprising a camera, and wherein the identifying includes:
    receiving, from the camera, an image of the surface;
    analyzing the image, using the processor; and
    based on the analysis, determining the color of the surface.

11. The system as recited in claim 10, wherein the camera is coupled to the mobile electronic device.

12. The system as recited in claim 8, wherein the projector is coupled to the mobile electronic device.

13. The system as recited in claim 12, wherein the projector is integrated into the mobile electronic device.

14. The system as recited in claim 8, wherein the memory, when executed by the processor, causes the processor to further perform the step of: purchasing, using the graphical user interface, an amount of paint coinciding with the selected color.

* * * * *